United States Patent
Ota

(10) Patent No.: US 11,516,178 B2
(45) Date of Patent: Nov. 29, 2022

(54) CONTROLLING MULTI-FUNCTION PRINTER COMMUNICATION IN NETWORK SEGMENTS VIA A BRIDGE DEVICE

(71) Applicant: Hiroshi Ota, Tokyo (JP)

(72) Inventor: Hiroshi Ota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/578,329

(22) Filed: Jan. 18, 2022

(65) Prior Publication Data

US 2022/0272067 A1     Aug. 25, 2022

(30) Foreign Application Priority Data

Feb. 24, 2021    (JP) .............................. JP2021-027495

(51) Int. Cl.
*G06F 15/16*      (2006.01)
*H04L 61/5014*    (2022.01)
*H04L 61/103*     (2022.01)
*H04L 41/12*      (2022.01)

(52) U.S. Cl.
CPC .......... *H04L 61/5014* (2022.05); *H04L 41/12* (2013.01); *H04L 61/103* (2013.01)

(58) Field of Classification Search
CPC ............................ H04L 61/5014; H04L 41/12
USPC ......................................................... 709/245
See application file for complete search history.

(56) References Cited

U.S. PATENT DOCUMENTS

| | | | |
|---|---|---|---|
| 6,895,443 B2* | 5/2005 | Aiken ..................... | H04L 61/59 709/217 |
| 7,856,024 B1* | 12/2010 | Karuppiah ............ | H04L 49/604 709/224 |
| 10,992,639 B2* | 4/2021 | Ota ..................... | H04L 61/5014 |
| 2019/0306113 A1* | 10/2019 | Ota ..................... | H04L 61/5014 |

FOREIGN PATENT DOCUMENTS

| | | | | |
|---|---|---|---|---|
| JP | 2004-172931 | | 6/2004 | |
| WO | WO-0176137 A2 | * | 10/2001 | ....... H04L 29/12018 |

* cited by examiner

*Primary Examiner* — Hee Soo Kim
(74) *Attorney, Agent, or Firm* — Duft & Bornsen, PC

(57) ABSTRACT

A communication control apparatus, a communication system, a communication control method, and a non-transitory recording medium. The communication control apparatus stores in one or more memories, identification information for identifying a registered device, sends a packet to a network to search for a device connected to the network, acquires address information assigned to the device connected to the network and identification information of the device connected to the network from the device that responded to the packet, and controls communication of the registered device using connection information that associates the identification information stored in the one or more memories with the address information of the device having the acquired identification information that matches the identification information stored in the one or more memories.

11 Claims, 14 Drawing Sheets

FIG. 2

| DEVICE | NETWORK ADDRESS/NETMASK | DESCRIPTION |
|--------|-------------------------|-------------|
| NET_A  | 192.168.1.0/24          |             |
| NET_B  | 172.16.1.0/24           |             |
| NET_C  | 10.0.1.0/24             |             |
| NET_I  | 203.0.113.0/29          | SEGMENT TO COMMUNICATE WITH THE INTERNET |

FIG. 3

| DEVICE | NETWORK ADDRESS/NETMASK | DEFAULT GATEWAY | DESCRIPTION |
|---|---|---|---|
| MFP | AUTO | AUTO | |
| BOX | AUTO<br>AUTO<br>10.0.1.3/24 | AUTO<br>AUTO<br>10.0.1.2/24 | COMMUNICATION UNIT A, M<br>COMMUNICATION UNIT B<br>COMMUNICATION UNIT C |
| R_A | 192.168.1.1/24<br>192.168.10.1/24 | - | ROUTER |
| DHCP_S_A | 192.168.1.2/24 | 192.168.1.1 | |
| PC_A | AUTO | AUTO | |
| R_B | 172.16.1.1/24<br>172.16.10.1/24 | - | ROUTER |
| DHCP_S_B | 172.16.1.2 | 172.16.1.1 | |
| SMB_S_B | 172.16.1.5 | | |
| PC_B | AUTO | AUTO | |
| R_C | 10.0.1.1/24<br>10.0.10.1/24<br>203.0.113.2/29 | 203.0.113.1/29 | ROUTER TO TRANSMIT PACKET TO THE INTERNET |
| PC_C | 10.0.1.6/24 | 10.0.1.1 | |
| SMB_S_C | 10.0.1.5/24 | | |

| DEVICE | NETWORK ADDRESS RANGE | DESCRIPTION |
|---|---|---|
| DHCP_S_A | 192.168.1.6 – 192.168.1.20 | |
| DHCP_S_B | 172.16.1.6 – 172.16.1.20 | |

FIG. 12A

| NUMBER | CONDITION | ACTION (WHEN DETERMINATION IS TRUE) |
|---|---|---|
| 100 | SOURCE MAC ADDRESS IS NOT MATCHING WITH MAC ADDRESS OF MFP | DROP |
| 200 | SOURCE IP ADDRESS IS MATCHING WITH IP ADDRESS OF MFP | TRANSFER |
| 999 | DEFAULT | DROP |

FIG. 12B

| NUMBER | CONDITION | ACTION (WHEN DETERMINATION IS TRUE) |
|---|---|---|
| 100 | SOURCE MAC ADDRESS IS MATCHING WITH MAC ADDRESS OF MFP | DROP |
| 200 | SOURCE IP ADDRESS IS MATCHING WITH IP ADDRESS OF MFP | DROP |
| 999 | DEFAULT | TRANSFER |

CONTROLLING MULTI-FUNCTION PRINTER COMMUNICATION IN NETWORK SEGMENTS VIA A BRIDGE DEVICE

CROSS-REFERENCE TO RELATED APPLICATIONS

This patent application is based on and claims priority pursuant to 35 U.S.C. § 119(a) to Japanese Patent Application No. 2021-027495, filed on Feb. 24, 2021, in the Japan Patent Office, the entire disclosure of which is hereby incorporated by reference herein.

BACKGROUND

Technical Field

The present disclosure relates to a communication control apparatus, a communication system, a communication control method, and a non-transitory recording medium.

Related Art

In order to connect a device such as a personal computer (PC) to a network, it is necessary to set information about the network such as an Internet Protocol (IP) address in advance. Setting this information manually can be tedious and can lead to misconfigurations.

In view of the above, a Dynamic Host Configuration Protocol (DHCP) server is placed on the network, and the IP address is dynamically assigned and automatically set to the device by the DHCP server. In DHCP, in order to make effective use of address resources, a time period is set during which each IP address assigned by the DHCP server can be used by the device.

SUMMARY

Embodiments of the present disclosure describe a communication control apparatus, a communication system, a communication control method, and a non-transitory recording medium. The communication control apparatus stores in one or more memories, identification information for identifying a registered device, sends a packet to a network to search for a device connected to the network, acquires address information assigned to the device connected to the network and identification information of the device connected to the network from the device that responded to the packet, and controls communication of the registered device using connection information that associates the identification information stored in the one or more memories with the address information of the device having the acquired identification information that matches the identification information stored in the one or more memories.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a diagram illustrating an example of a network connected to a communication control apparatus;

FIG. 3 is a diagram illustrating an example of network settings of each device;

FIGS. 12A and 12B are diagrams illustrating examples of tables referred to by the communication control apparatus to control communication;

Figure 1:
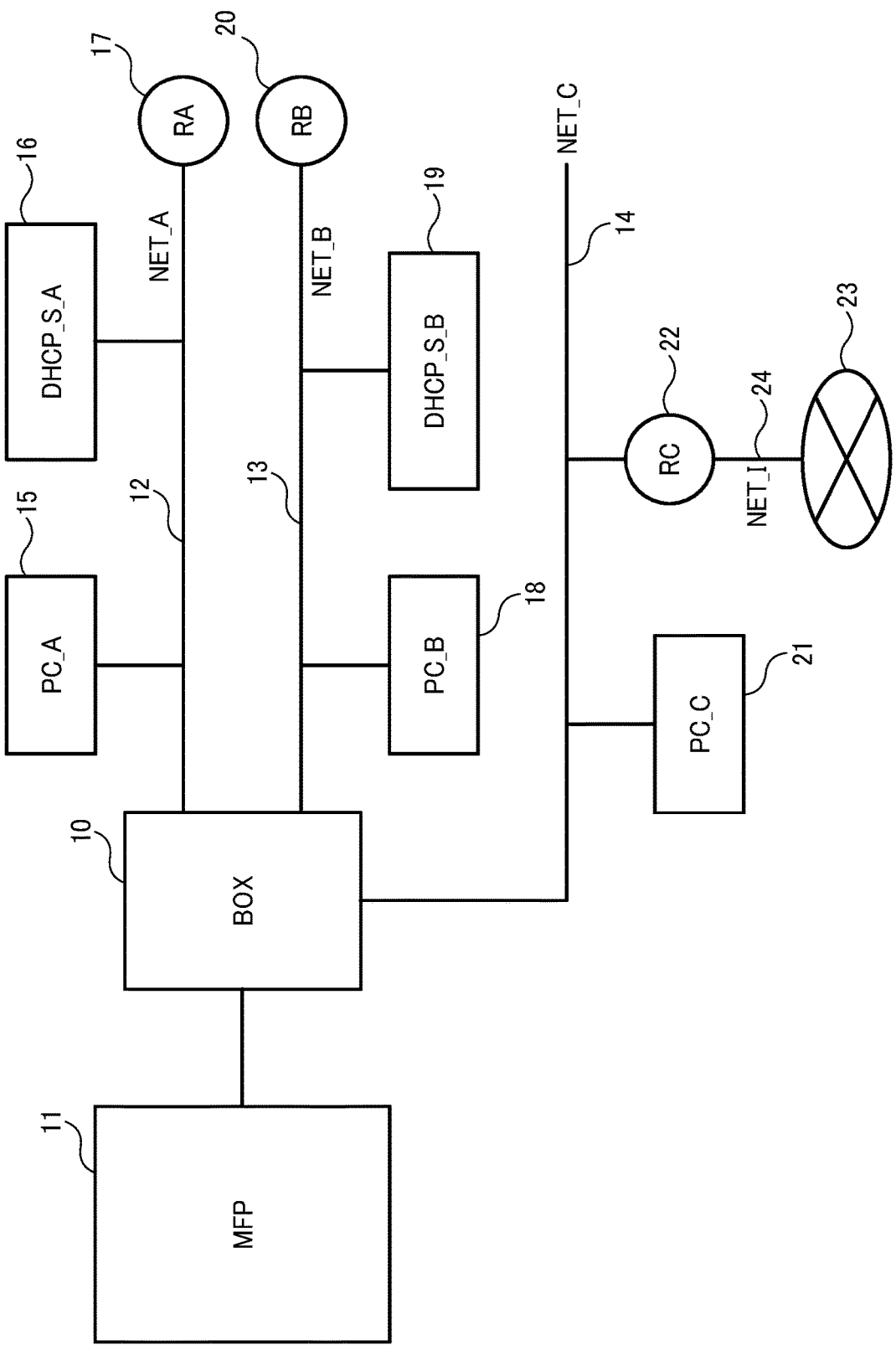
FIG. 1 is a diagram illustrating an example of a configuration of a communication system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, the present disclosure is described with reference to embodiments, but the present disclosure is not limited to the embodiments described below.

FIG. 1 is a diagram illustrating an example of a configuration of a communication system. The communication system includes an interface box (hereinafter referred to as a box) 10 as a device for controlling communication, an MFP 11 as an information processing apparatus, and one or more networks 12 to 14 (Net_A to Net_C).

A PC (PC_A) 15, a DHCP server (DHCP_S_A) 16 and a router (RA) 17 are connected to the network (Net_A) 12. The router 17 functions as a default gateway for the network 12 and connects the network 12 to other networks. The default gateway is a node for connecting the network 12 which is an internal network and another network which is an external network.

A PC (PC_B) 18, a DHCP server (DHCP_S_B) 19, and a router (RB) 20 are connected to the network (Net_B) 13. The router (RB) 20 connects the network 13 to other networks.

A PC (PC_C) 21 and a router (RC) 22 are connected to the network (Net_C) 14. The router 22 connects the network 14 and the network (Net_I) 24 connected to the internet 23. The networks 12 to 14 are all private networks and are not directly connected to the internet 23.

The degree of security for each network (less virus or attack from a third party) is Net_A>Net_B>Net_C. The network 12 is the most secure network.

The box 10 includes a plurality of connection ports (ports), and the MFP 11 and the networks 12 to 14 are connected to each port. In the box 10, one port is a dedicated port for connecting a device to be controlled for communication, and in the example illustrated in FIG. 1, the dedicated port is the port for the MFP 11. The MFP 11 is connected to the dedicated port by using a cable or the like. The other ports are ports for connecting one or more networks 12 to 14. A plurality of MFPs 11 may be connected to one port through a relay device such as a switching hub. The switching hub is a device having a function of determining a destination and transmitting only to related devices.

The box 10 directly transfers the access from the most secure network 12 to the MFP 11, and also directly transfers the access from the MFP 11 to the network 12. Hereinafter, such direct transfer is referred to as a bridge transfer, and the network 12 is referred to as a bridge segment. The bridge segment includes devices (PC 15, DHCP server 16, router 17) on the network 12. From the bridge segment, basically all the functions of the MFP 11 can be used.

Therefore, the MFP 11 communicates with the DHCP server 16 on the network 12 and uses the DHCP mechanism to configure settings related to the network such as the IP address, subnet mask, and default gateway. At this time, the DHCP communication from the MFP 11 passes through the box 10.

The box 10 performs Network Address Port Translation (NAPT) for access from the networks 13 and 14 other than the network 12, and automatically rewrites destination IP address at the time of transfer. Here, translating and forwarding such address is called packet forwarding, and the networks 13 and 14 are called packet forwarding segments. The packet forwarding segments includes devices (PC 18, DHCP server 19, router 20, PC 21, router 22) on the networks 13 and 14. From the packet transfer segment, some functions of the MFP 11 can be used. The packet is information exchanged in communication, and control information such as source and destination information is added to the data.

Functions of the MFP 11 include a scan function, a copy function, a print function, a fax transmission and reception function, a communication function, and the like. Therefore, all these functions of the MFP 11 can be used from the PC 15 or the like on the network 12, and only a part of the functions such as the print function can be used from the PC 18 or the like on the network 13 or the PC 21 or the like on the network 14. The available functions can be set in advance.

Since the device on the network 13 communicates with the MFP 11 by NAPT communication, the DHCP server 19 does not execute the process of allocating the IP address or the like to the MFP 11.

In the example illustrated in FIG. 1, the device to be controlled connected to the box 10 is the MFP 11, but the device to be controlled is not limited to the MFP. The device to be controlled includes, for example, a projector (PJ), an interactive whiteboard (IWB: white board with electronic whiteboard function capable of mutual communication), an industrial machine, an imaging device, a sound collecting device, a medical device, a network home appliance, an automobile (connected car), a notebook PC, a mobile phone, a smartphone, a tablet terminal, a game machine, a personal digital assistant (PDA), a wearable PC, a desktop PC, and the like.

Further, although one PC 15, PC 18, and PC 21 are respectively connected to the networks 12, 13, and 14, two or more PCs and other devices may be connected. The PCs 15, 18 and 21 communicate with the MFP 11 to print documents and the like created by the PCs 15, 18, and 21. Similarly, the DHCP server 16, router 17, DHCP server 19, router 20, and router 22 on the networks 12 to 14 also communicate with the MFP 11. Further, a device that can be connected to the internet 23 can also communicate with the MFP 11 through the internet 23 based on the communication control settings by the router 22 or the like. However, when the MFP 11 is used through the networks 13 and 14, the available functions are limited.

In the example illustrated in FIG. 1, data are transferred via bridge between the MFP 11 and the network 12, but the present disclosure is not limited to this configuration, and the MFP 11 and the network 13 or the MFP 11 and the network 14 may be configured such that data are transferred via bridge. Further, although the DHCP server is not provided on the network 14, the DHCP server may be provided.

The configuration of the networks 12 to 14 and 24 is described with reference to FIG. 2. Each of the networks 12 to 14 and 24 has a network address which is the IP address of the network itself. The IP address is address information assigned to identify a destination or a source. The IP address consists of four sets of numbers separated by dots (.) expressed in decimal in Internet Protocol Version 4 (IPv4) and includes a network part for identifying a network and a host part for identifying a host which is a device on the network. Each of the networks 12 to 14 and 24 has a net mask (also referred to as a subnet mask) indicating which part of the IP address belongs to the network.

For example, the network 12 indicated by Net_A has the network address of "192.168.1.0" and the netmask of "/24". The first to the third sets "192.168.1" of the four sets of numbers "192", "168", "1", and "0" that make up the IP address (up to the 24th bit since each set is 8-bit) is the network part and the remaining 4th set "0" indicates the host part. The IP address with the host part "0" is the network address, and the IP address with the host part "255" is the broadcast address. The broadcast address is an IP address used to collectively send data to all hosts on the same network. One of "1" to "254", excluding "0" and "255", is assigned to each host as the host part.

The DHCP servers 16 and 19 manage the network addresses and netmasks, receive address setting requests, and assign the IP addresses to requesting devices based on the managed network addresses and netmasks. The DHCP servers 16 and 19 store information of the IP address already assigned and assign the IP address which has not been assigned yet to the requesting device.

The devices on the networks 12 and 13 request the IP addresses to the DHCP servers 16 and 19 according to the settings. When a setting to automatically acquire the IP address is set, the devices on the networks 12 and 13 request the IP address to the DHCP servers 16 and 19 and set the IP address assigned by the DHCP servers 16 and 19. On the other hand, when a setting to manually set the IP address is set, the administrator inputs the IP address on the setting screen and sets the IP address manually. Since the DHCP server is not installed for the devices on the networks 14 and 24, the IP address is manually set.

The devices on the networks 12 to 14 and 24 communicate using a MAC address, which is identification information for uniquely identifying each device, and the set IP address.

The network settings of each device is described with reference to FIG. 3. The devices for network settings are the box 10, MFP 11, PC 15, DHCP server 16, router 17, PC 18, DHCP server 19, router 20, PC 21, and router 22. The example illustrated in FIG. 3 further includes a Server Massage Block (SMB) server (SMB_S_B, SMB_S_C) as a file server used for file sharing, print sharing, and the like.

The network address/subnet mask and default gateway illustrated in FIG. 3 are manually set by inputting a fixed address (for example, 192.168.1.1/24) or automatically set to an address assigned by the DHCP server.

For the box 10, MFP 11, PC 15, etc., network settings are distributed by DHCP in order to reduce the operational load, so that the network settings can be managed on the DHCP servers 16 and 19 without requiring setting of the IP address by each device. In addition to the function of dynamically changing the IP address, the DHCP servers 16 and 19 also include a function of fixing the network settings to the MAC address assigned to the device as the identification information for identifying the device. Therefore, it is possible to operate with a fixed device address.

Figures 4, 5:
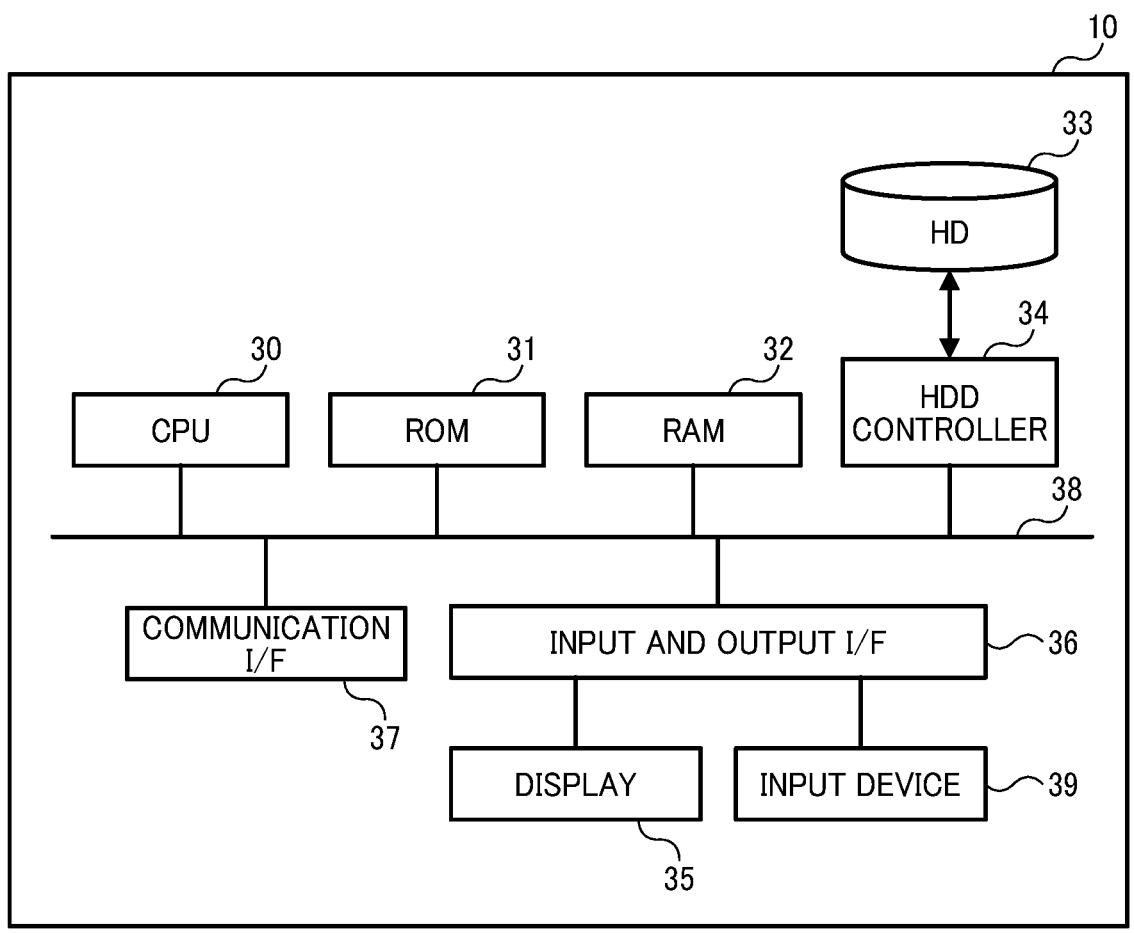
FIG. 4 is a diagram illustrating an example of an address allocation range of a DHCP server.
FIG. 5 is a block diagram illustrating an example of a hardware configuration of the communication control apparatus.

FIG. 4 is a diagram illustrating an address allocation range of the DHCP servers 16 and 19. The DHCP servers 16 and 19 manage a range of IP addresses that can be assigned and use that range as the address allocation range. As the IP address that can be assigned to each device, the IP address other than the IP address allocation range managed by the DHCP servers 16 and 19 can be set. The IP address can be set by a method other than DHCP.

The example illustrated in FIG. 4 indicates that the host part of the IP address can be assigned from 6 to 20. Accordingly, "192.168.1.6" can be assigned to the box 10 on the network 12, "192.168.1.7" can be assigned to the MFP 11, and "192.168.1.8" can be assigned to the PC 15.

Although the network settings by DHCP in IPv4 is illustrated, DHCP can be used in the case of version 6 (IPv6) as well. In addition, as a method of assigning the IP address, a router advertisement technology for dynamic allocation from a router can also be used.

FIG. 5 is a block diagram illustrating an example of a hardware configuration of the box 10. Similar to a general PC, the box 10 includes a central processing unit (CPU) 30, a read only memory (ROM) 31, a random access memory (RAM) 32, a hard disk (HD) 33, a hard disk drive (HDD) controller 34, a display 35, an input and output interface (I/F) 36, a communication I/F 37, a data bus 38, and an input device 39.

The CPU 30 controls the entire box 10 and controls communication with the MFP 11 connected to the box 10. The ROM 31 stores programs such as an initial program loader (IPL) to boot the CPU 30. The RAM 32 provides a working area for the CPU 30. The HD 33 stores various data such as programs. The HDD controller 34 controls reading or writing of various data to and from the HD 33 under the control of the CPU 30. The display 35 displays various information such as a cursor, menu, window, characters, or image.

The input and output I/F 36 is an interface for connecting the display 35 and the input device 39. The communication I/F 37 is an interface for connecting the MFP 11 and the networks 12 to 14 and communicating with the MFP 11 and the devices on the networks 12 to 14. The data bus 38 is an address bus, a data bus, or the like for electrically connecting each component such as the CPU 30. The input device 39 is a device that inputs characters, numerical values, various instructions, and the like, selects and executes various instructions, selects a processing target, moves a cursor, and the like. The display 35 and the input device 39 do not have to be separate devices, and one device such as a display provided with a touch panel which includes both functions may be used.

Figure 6:
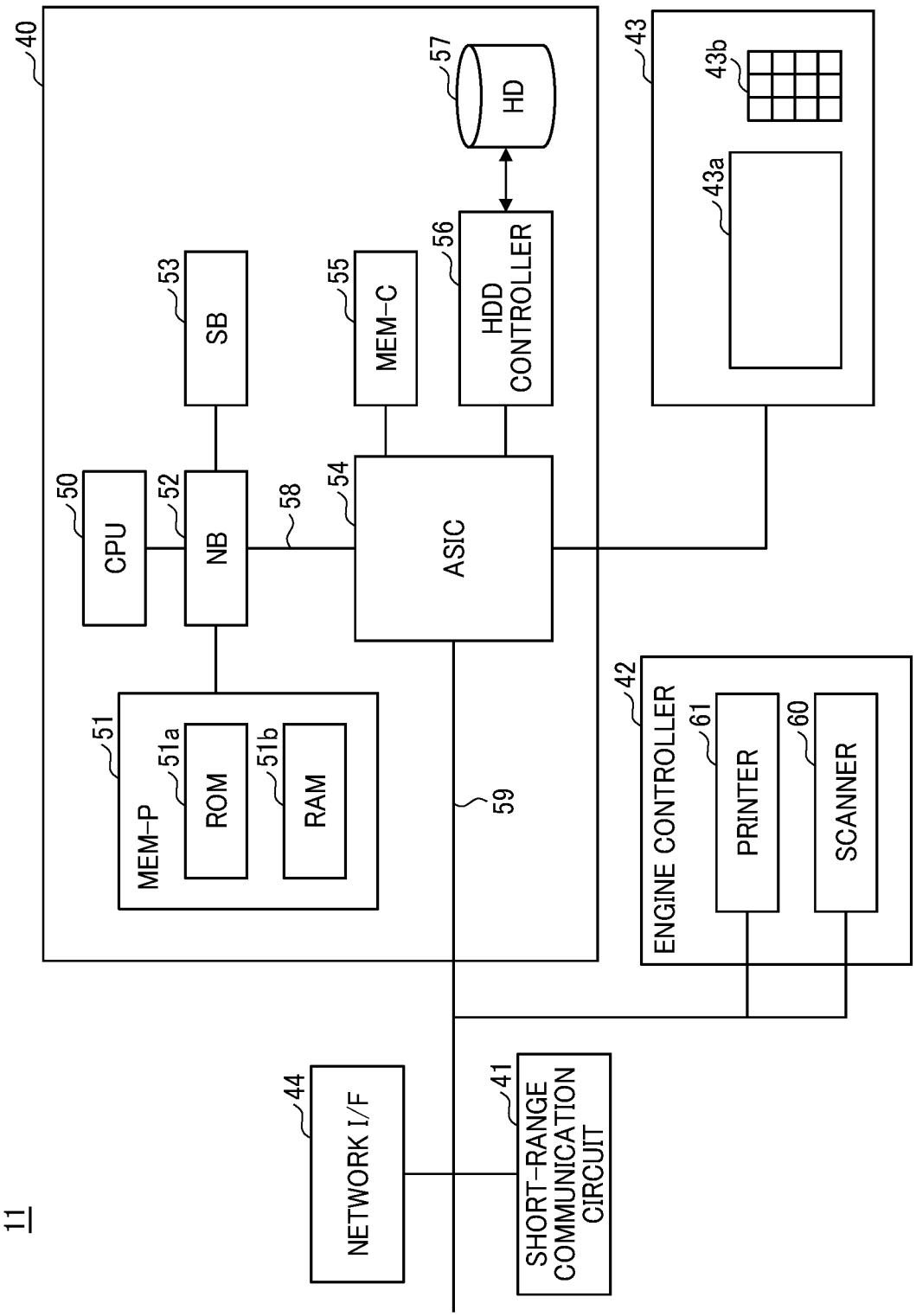
FIG. 6 is a block diagram illustrating an example of a hardware configuration of an information processing apparatus.

FIG. 6 is a diagram illustrating an example of a hardware configuration of the MFP 11 as an electronic device included in the communication system. The MFP 11 includes a controller 40, a short-range communication circuit 41, an engine controller 42, a control panel 43, and a network I/F 44.

The controller 40 includes a CPU 50, which is the main part of the computer, a system memory (MEM-P) 51, a north bridge (NB) 52, a south bridge (SB) 53, an application specific integrated circuit (ASIC) 54, a local memory (MEM-C) 55, an HDD controller 56, and an HD 57. The NB 52 and the ASIC 54 are connected to each other by an Accelerated Graphics Port (AGP) bus 58.

The CPU 50 is a processor that performs overall control of the MFP 11. The NB 52 is a bridge for connecting the CPU 50, the MEM-P 51, SB 53, and the AGP bus 58, and includes a memory controller that controls reading and writing to the MEM-P 51, a Peripheral Component Interconnect (PCI) master, and an AGP target.

The MEM-P 51 includes a ROM 51a which is a memory for storing programs and data for implementing each function of the controller 40, and a RAM 51b used as a memory for developing programs and data and drawing memory at the time of memory printing. The program stored in the ROM 51a may be stored in any computer-readable storage medium, such as a compact disc-read only memory (CD-ROM), compact disc-recordable (CD-R), or digital versatile disc (DVD), in a file format installable or executable by the computer for distribution.

The SB 53 is a bridge that connects the NB 52 with a PCI device or a peripheral device. The ASIC 54 is an integrated circuit (IC) dedicated to an image processing use, and connects the AGP bus 58, a PCI bus 59, the HDD controller 56, and the MEM-C 55. The ASIC 54 includes a PCI target and an AGP master, an arbiter (ARB) that forms the core of the ASIC 54, a memory controller that controls the MEM-C 55, and a plurality of Direct Memory Access Controllers (DMACs) that rotate image data by hardware logic or the like. Further, the ASIC 54 includes a PCI unit that transfers data between the scanner 60 and the printer 61 through the PCI bus 59. The ASIC 54 may be connected to a Universal Serial Bus (USB) interface, or an Institute of Electrical and Electronics Engineers 1394 (IEEE1394) interface.

The MEM-C 55 is a local memory used as a copy image buffer and a code buffer. The HD 57 is a storage for storing image data, font data used during printing, and forms. The HDD controller 56 controls reading or writing of data to and from the HD 57 according to the control of the CPU 50. The AGP bus 58 is a bus interface for a graphic accelerator card suggested for speeding up graphic processing, and the graphic accelerator card can be speeded up by directly accessing the MEM-P 51 with high throughput.

The short-range communication circuit 41 is a communication circuit using Near Field Communication (NFC), BLUETOOTH (registered trademark), or the like.

The engine controller 42 includes the scanner 60 and the printer 61. The control panel 43 includes a display panel 43a such as a touch panel that displays the current setting value, selection screen, and the like and receives input from the user. Also, the control panel 43 is provided with an operation panel 43b including a numeric keypad for receiving set values of conditions related to image formation such as density setting conditions and a start key for receiving copy start instructions.

The controller 40 controls, for example, rendering, communication, input from the control panel 43, and the like. The scanner 60 or the printer 61 includes an image processing function such as error diffusion and gamma conversion.

The MFP 11 can sequentially switch and select a document box function, a copy function, a print function, and a facsimile function by using an application switching key on the control panel 43. When each function is selected, each mode is set.

The network I/F 44 is an interface for connecting to the box 10 and performing data communication with devices on the networks 12 to 14 through the box 10. The short-range communication circuit 41 or the network I/F 44 are electrically connected to the ASIC 54 through the PCI bus 59.

Figure 7:
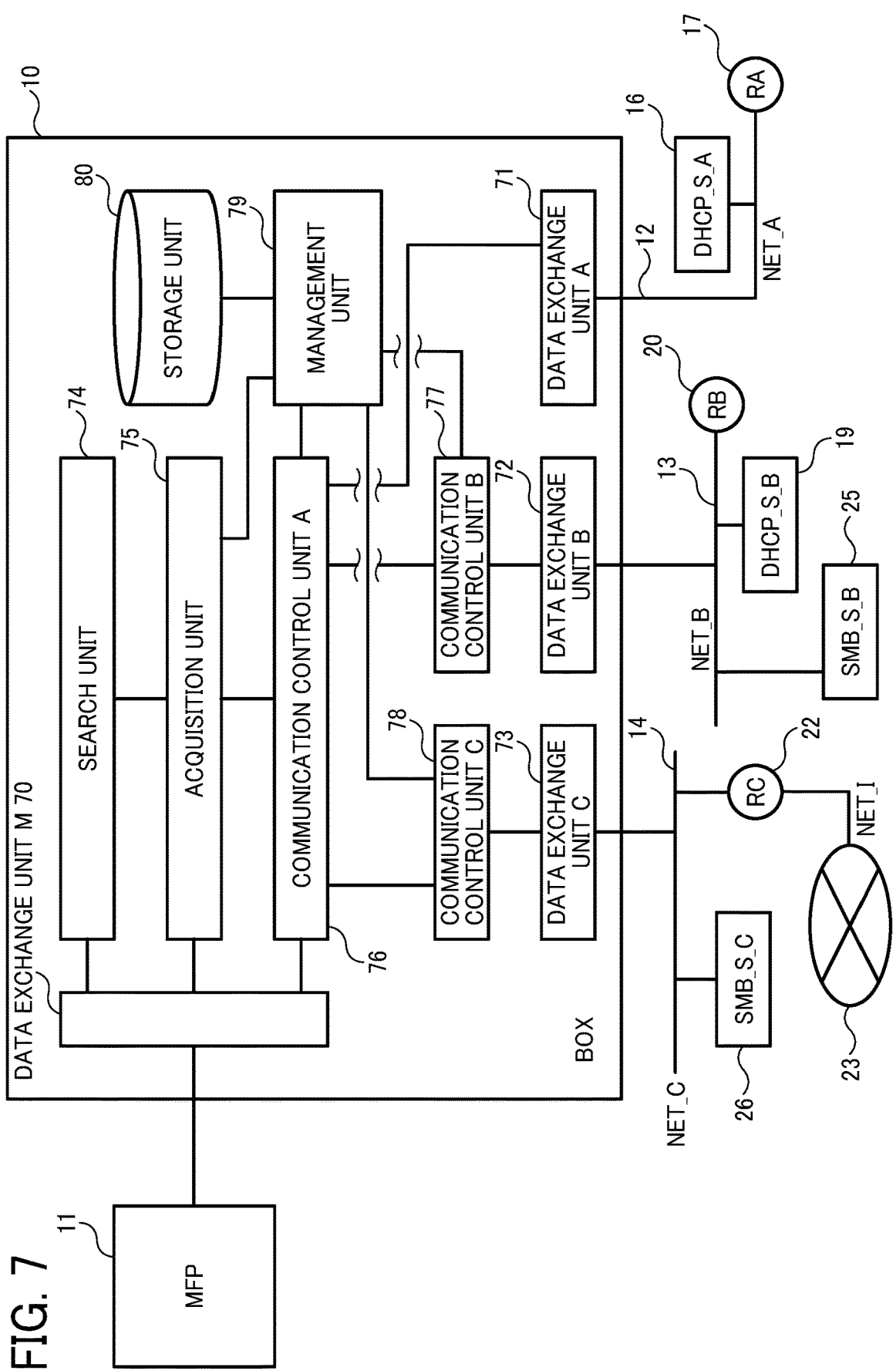
FIG. 7 is a block diagram illustrating an example of a functional configuration of the communication control apparatus.

FIG. 7 is a block diagram illustrating an example of a functional configuration of the box 10. Each function included in the box 10 is implemented by a processing circuit such as the CPU 30.

The box 10 includes data exchange units 70 to 73, a search unit 74, an acquisition unit 75, communication control units 76 to 78, a management unit 79, and a storage unit 80.

The data exchange unit 70 transmits and receives data or the like to and from the MFP 11. The data exchange unit 71 transmits and receives data or the like to and from a device on the network 12. The data exchange unit 72 transmits and receives data or the like to and from a device on the network 13. The data exchange unit 73 transmits and receives data or the like to and from a device on the network 14.

The communication control unit 76 bridges the network 12 and the MFP 11, and directly transfers the access from the network 12 to the MFP 11, and also directly transfers the access from the MFP 11 to the network 12. Further, the communication control unit 76 sends the packets received from the networks 13 and 14 through the communication control units 77 and 78 to the MFP 11 and sends the packet from the MFP 11 to the networks 13 and 14 through the communication control units 77 and 78.

The communication control units 77 and 78 perform NAPT, send the packets to the MFP 11 through the communication control unit 76, and receive the packet from the MFP 11 through the communication control unit 76.

The search unit 74 sends a packet (search packet) on the network 12 in order to search for a device on the network 12, and periodically searches the MFP 11. This is because the DHCP server 16 sets a time limit to the IP address assigned to the MFP 11, and the IP address reassigned after the time limit needs to be acquired.

Further, the search unit 74 searches the MFP 11, for example, after ETHERNET (registered trademark) is linked down and linked up, in addition to the periodical execution. ETHERNET is an architecture of wired local area network (LAN). A link down is a state in which communication is not possible due to a cable disconnection or the like. A link up is to change from a state where communication is not possible to a state where communication is possible by inserting a disconnected cable or the like.

The search unit 74 sends the search packet to the network 12 using multicast, and searches for the device on the network 12. Multicast is a method of transmitting the same data to a plurality of specific parties all at once.

When searching for the device using Multicast Domain Name Service (mDNS), the search unit 74 specifies a type of service and searches for the device that provides the specified type of service. The types of services are, for example, "._printer._tcp", "._ipp._tcp", etc. The former indicates printing, and the latter indicates that print data can be exchanged using a Transmission Control Protocol/Internet Protocol (TCP/IP) network. The search unit 74 simultaneously transmits packets specifying the types of these services to a plurality of devices on the network 12 by multicast. The type of service is not limited to printing, and may be copying, reading a document, sending or receiving a fax, or the like.

Among the plurality of devices on the network 12, the device capable of providing the above-mentioned type of service responds to the packet. In the above example, since the MFP 11 includes the printing function, the MFP 11 responds that the printing function is available, together with the host name or domain name. The host name or domain name is a registered name for identifying and managing devices on the network.

The MFP 11 stores the IP address assigned by the DHCP server 16 in association with the host name or the domain name. The acquisition unit 75 designates the host name or the domain name to the MFP 11 for which a response has been obtained, requests name resolution, and acquires the IP address assigned to the MFP 11.

The device searched by the search unit 74 is not limited to one device. This is because there may be multiple devices on the network that provide the same service. In such case, a plurality of IP addresses is acquired by the acquisition unit 75 for the multiple devices. Further, depending on the device, two IP addresses, IPv4 and IPv6, may be set, and even when the search unit 74 searches for only one device, a plurality of IP addresses may be acquired.

The acquisition unit 75 creates a list of acquired IP addresses, requests the device having the corresponding MAC address according to the list, and acquires the MAC address corresponding to the IP address from the device. To acquire the MAC address, for example, when performing Internet Control Message Protocol (ICMP) ECHO (ping), the MAC address on the network is acquired from the IP address by performing address resolution by Address Resolution Protocol (ARP).

The IP address and the MAC address are briefly described in the following. The MAC address is the identification information for uniquely identifying the device and is information that cannot be changed. On the other hand, the IP address is address information indicating which network the device resides and is information that has a time limit and is reassigned when the time limit expires. It is possible to identify the device by using only the MAC address, but it is not possible to know on which network the device is located. Since the IP address alone is assigned for a limited time, it is not possible to know whether the device is really the device of the communication counterpart. Therefore, in communication, both the MAC address and the IP address are used as a pair.

The storage unit 80 stores the MAC address of the device to be controlled, which is registered in advance. The management unit 79 compares the MAC address acquired by the acquisition unit 75 with the MAC address stored in the storage unit 80 and determines whether the MAC addresses match. The management unit 79 associates the IP address corresponding to the MAC address determined to match with the MAC address stored in the storage unit 80 sets the MAC address and the IP address as a pair and stores the pair as connection information in the storage unit 80.

The communication control units 76 to 78 control the communication of the MFP 11 by using the connection information stored in the storage unit 80. The communication control units 76 to 78 allow access to the IP address corresponding to the MAC address in the connection information and enable communication with the MFP 11. On the other hand, the communication control units 76 to 78 deny access to the IP address that does not correspond to the MAC address.

The processing by the search unit 74, the acquisition unit 75, and the management unit 79 illustrated in FIG. 7 becomes unnecessary when a fixed address is manually set as the IP address of the MFP 11. Therefore, the processing by the search unit 74, the acquisition unit 75, and the management unit 79 is executed only when DHCP is used.

Figure 8:
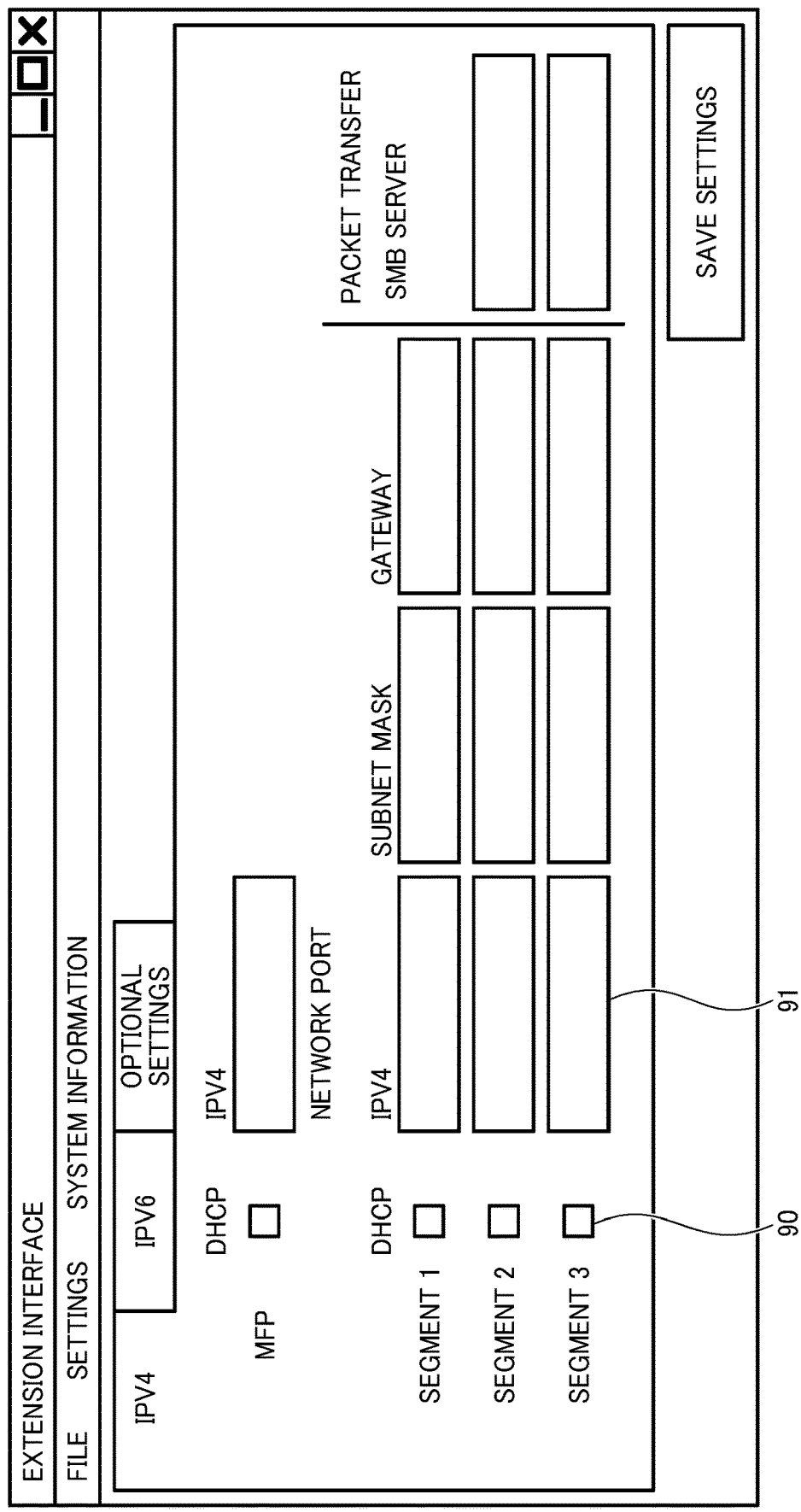
FIG. 8 is a diagram illustrating a first example of a user interface (UI) screen of the communication control apparatus.

FIG. 8 is a diagram illustrating an example of a screen in an initial state as a first example of a UI screen for setting the IP address. The administrator sets whether to use DHCP for the MFP 11 and each segment. The UI screen includes a check box 90 for setting whether to use DHCP. Further, the UI screen includes an input field 91 for inputting the IP address when DHCP is not used.

The IPv4 of the MFP 11 and the segments 1 to 3 are the IP address of the MFP 11 and the networks 12 to 14, and the subnet mask of the segments 1 to 3 is the subnet mask of the networks 12 to 14. The gateways in segments 1 to 3 are the IP addresses of routers 17, 20 and 22 on the networks 12 to 14. The SMB servers in segments 2 and 3 are the IP addresses of the SMB servers on the networks 13 and 14.

Figure 9:
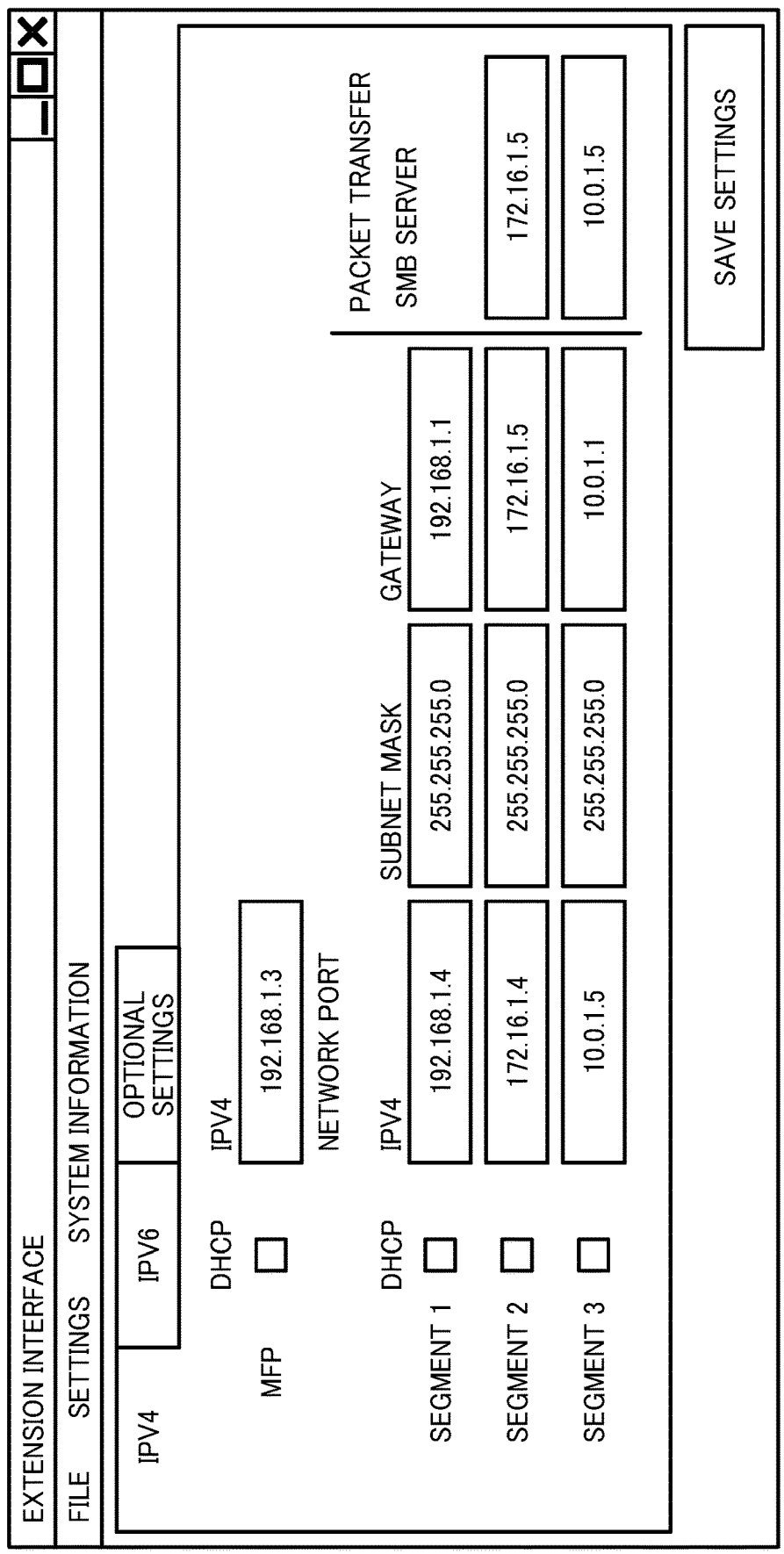
FIG. 9 is a diagram illustrating a second example of the UI screen of the communication control apparatus.

FIG. 9 is a diagram illustrating a second example of the UI screen for setting the IP address when DHCP is not used. When DHCP is not used, the check box 90 is not checked and the IP address is entered in the input field 91 and set.

When DHCP is not used, the IP addresses must be input in all of the input fields 91. Mistakes in input are not allowed and causes inconvenience in operation.

Figure 10:
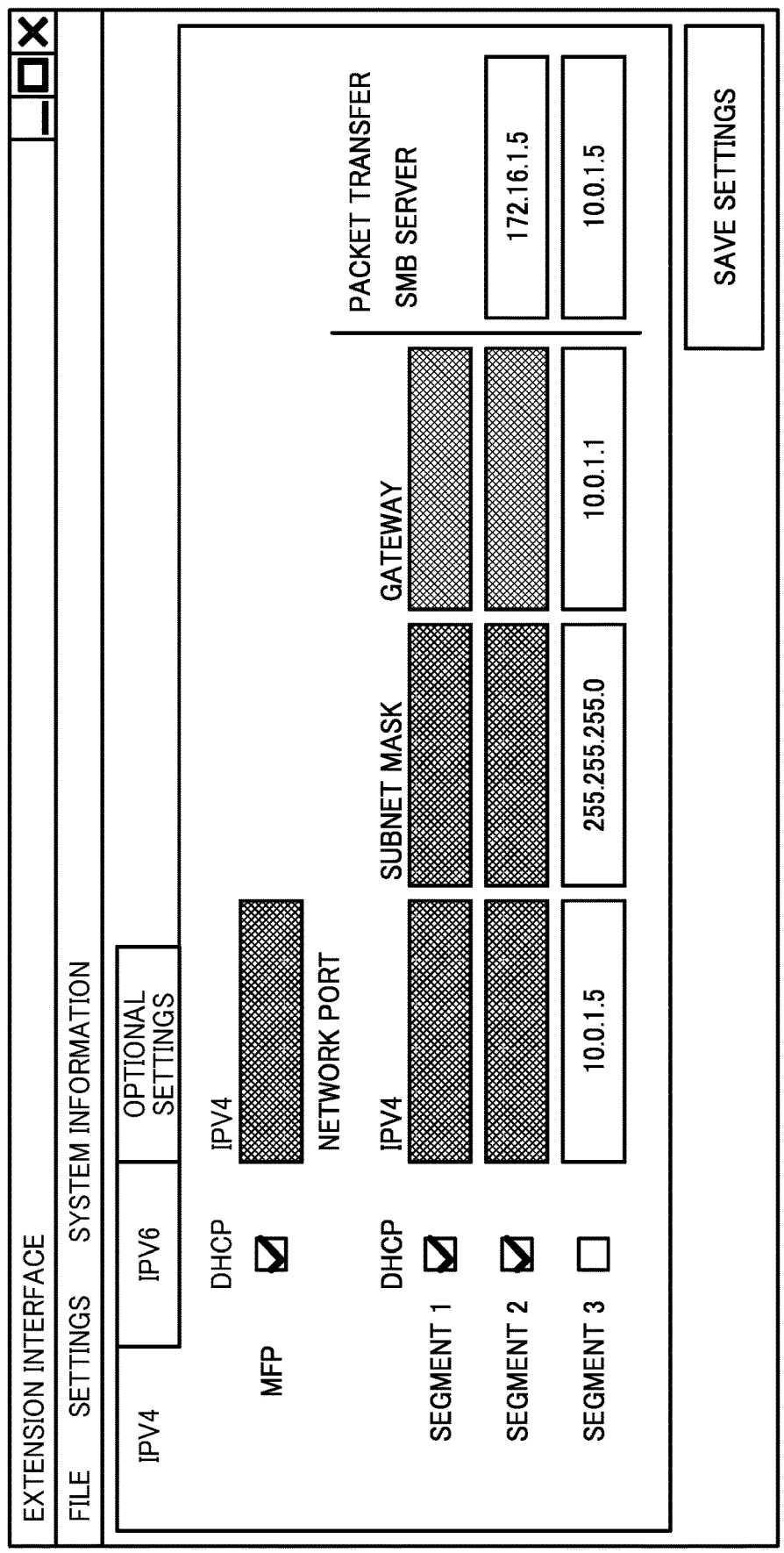
FIG. 10 is a diagram illustrating a third example of the UI screen of the communication control apparatus.

FIG. 10 is a diagram illustrating a third example of the UI screen for setting the IP address when DHCP is used. When using DHCP, the check box 90 needs to be checked, and inputting the IP address is not necessary. Since the segment 3 is the network 14 and the DHCP server is not installed, the IP address is input and set.

By setting to use DHCP, it is not necessary to set the IP address, subnet mask, and default gateway, such that the operation is simplified, and the operation load can be reduced. The DHCP server may be installed for segment 3, and all of segments 1 to 3 may be set to use DHCP. In this case, it is not necessary to input the IP address or the like.

Figure 11:
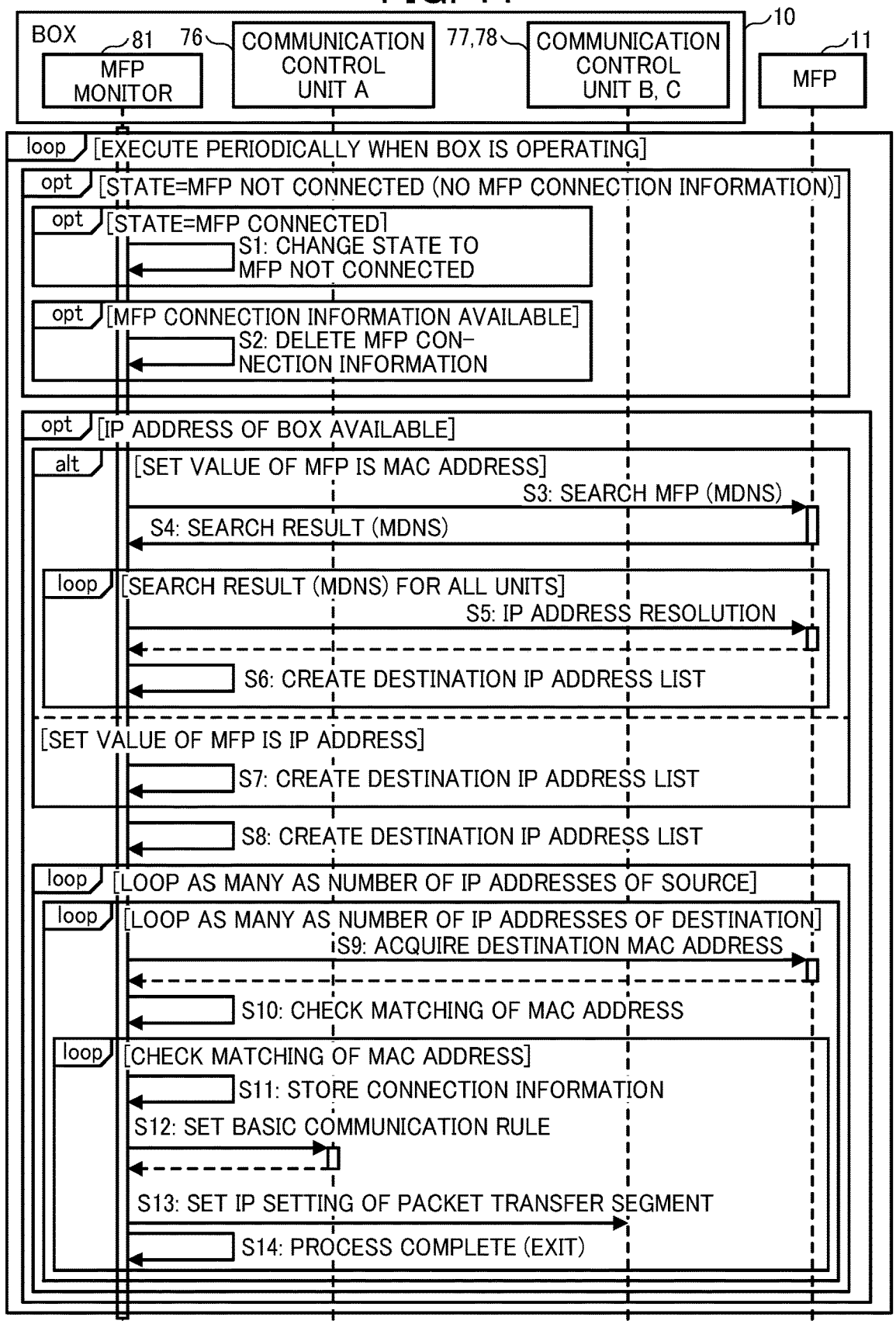
FIG. 11 is a sequence diagram illustrating an example of control executed by the communication control apparatus.

FIG. 11 is a sequence diagram illustrating an example of a process of acquiring connection information when setting to use DHCP is made. In FIG. 11, a functional unit including the search unit 74, the acquisition unit 75, the management unit 79, and the storage unit 80 is referred to as an MFP monitor 81. The following processes are basically performed by the MFP monitor 81.

This process is periodically executed while the box 10 is in operation. In step S1, when the MFP 11 is not connected to the box 10 but the state indicates connection to the MFP, the state is transitioned to the MFP not connected. In step S2, when the MFP connection information (pair of IP address and MAC address) is missing but is present (stored), the MFP connection information is deleted. In response to a determination that the status is the MFP connected and the MFP connection information is present, the process is terminated.

Examples of the above-described case include the case when the cable connecting the box 10 and the MFP 11 is disconnected, the case when power of the MFP 11 is turned off, the case when communication is broken between the box 10 and the MFP 11, the case when the IP address assigned by the DHCP server has expired, and the like.

When the above-described case is resolved, i.e., the cable is reconnected, the power is turned on, the communication failure is recovered, or the IP address is reassigned, the state is set to the MFP connection, and the MFP connection information is created and stored by the following process. At this time, it is assumed that the MFP 11 requests the DHCP server 16 for the IP address and the IP address is assigned by the DHCP server 16.

In step S3, when the setting value of the MFP 11 is the MAC address, the MFP 11 is searched using mDNS in order to acquire the IP address and stores the connection information. In mDNS, the type of service is designated and a corresponding device is searched. The device that can provide the designated service type returns a search reply. In this example, the MFP 11 returns a response in step S4. The response includes the host name or domain name of the MFP 11.

In step S5, since the response from the MFP 11 does not include the IP address, the MFP 11 is requested to perform name resolution (IP address resolution). That is, the network 12 is requested to indicate the IP address of the device having the host name or domain name obtained in the response. In step S6, when all the IP addresses for the searched devices have been acquired, the destination IP address array, which is a list of IP addresses is created.

In step S7, when the setting value of the MFP 11 is the IP address, it is not necessary to acquire the IP address and the list of IP addresses is created from the setting value.

In step S8, after creating the IP address array of the destination, the IP address array of the source is created. The source IP address array is a list of box 10's own IP addresses. The IP address of the box 10 itself is assigned by the DHCP server 16 when the IP address is set to be assigned by the DHCP server 16 on the network 12. When set manually, the IP address is the fixed IP address set manually.

The corresponding MAC address is not known from the list of IP addresses. In step S9, based on the IP address, ARP is performed by ICMP ECHO, and the MAC address corresponding to the IP address is acquired.

The acquired MAC address corresponds to the IP address used for acquisition, and in step S10, the acquired MAC address is compared with the MAC address of the set value to check whether the MAC addresses match. In step S11, the IP address corresponding to the matched MAC address is associated with the MAC address of the set value and stored as the connection information. The connection information is stored in the storage unit 80, in a table called, for example, an ARP table. By storing in the ARP table, the corresponding address is obtained by referring to this table.

Once correspondence between the IP address and the MAC address is determined, it is possible to control the communication by using the correspondence. In order to control the communication, it is necessary to set access control. In step S12, a basic communication rule for communication between the network 12 and the MFP 11 is set.

In step S13, IP setting of the packet transfer segment is performed for communication between the networks 13 and 14 and the MFP 11. The basic communication rule setting is a setting for directly forwarding a packet, and the IP setting for a packet forwarding segment is a setting for the IP address required for Network Address Port Translation (NAPT) conversion. In step S14, the process ends when these settings are completed.

With reference to FIGS. 12A and 12B, the communication control performed by the communication control unit 76 is described. In the case of data from the data exchange unit 70, first, it is confirmed whether the MAC address of the transmission source that transmitted the data to the data exchange unit 70 does not match the MAC address of the MFP 11. The IP address of the MFP 11 and the corresponding MAC address are stored as the connection information. Whether the MAC addresses match can be determined by referring to the connection information.

A determination that the MAC addresses do not match indicates that the device connected to the data exchange unit 70 is not the MFP 11. Therefore, the data is dropped (discarded). When the MAC addresses match, whether the IP address of the source matches the address of the MFP 11 is confirmed. Whether the IP addresses match can also be determined by referring to the connection information.

When the IP addresses match, the data is transferred to the data exchange unit that sends the data to the network to which the destination device is connected. Then, the data is transmitted from the MFP 11 to the destination device. When the IP addresses do not match, the data is dropped without the communication control unit 76 checking any particular condition. Therefore, the data is controlled to be transferred only when both the IP address and the MAC address of the source match both the IP address and the MAC address of the MFP 11.

The case when data is received from the data exchange unit 71 is described in the following. Since the same processing is performed for the data received from the data exchange units 72 and 73, the description of the case of the data from the data exchange units 72 and 73 is omitted here.

First, whether the MAC address of the transmission source that transmitted the data to the data exchange unit 71 matches the MAC address of the MFP 11 is determined. When the MAC addresses match, the communication control unit 76 determines that the device connected to the data exchange unit 71 is the MFP 11, and the MFP 11 is premised on being connected to the data exchange unit 70, so the data is dropped.

When the MAC addresses do not match, the second step is to check whether the IP address of the source matches the IP address of the MFP. When the IP addresses match, the data is dropped. When the IP addresses do not match, the data is transferred without the communication control unit 76 checking any particular condition. Therefore, control is performed so that the data is transferred only when both the source IP address and the MAC address do not match both the IP address and the MAC address of the MFP 11, that is, when the device is other than the MFP 11.

The box 10 changes the range of available functions according to the segment of the communication partner. For example, in the case of communication with the bridge segment, the box 10 makes all functions available. When the request from the bridge segment is the print request, the print request is forwarded to the MFP 11, and when the request is a document read request, scanned data of the document is forwarded.

On the other hand, in the case of communication with the packet transfer segment, the box 10 permits only the use of a part of functions. When the function to be permitted is the print function, in response to a print request from the packet transfer segment, the box 10 transfers the print request to the MFP 11 but does not transfer the read request to the MFP 11 even when the document read request is received.

Figure 13:
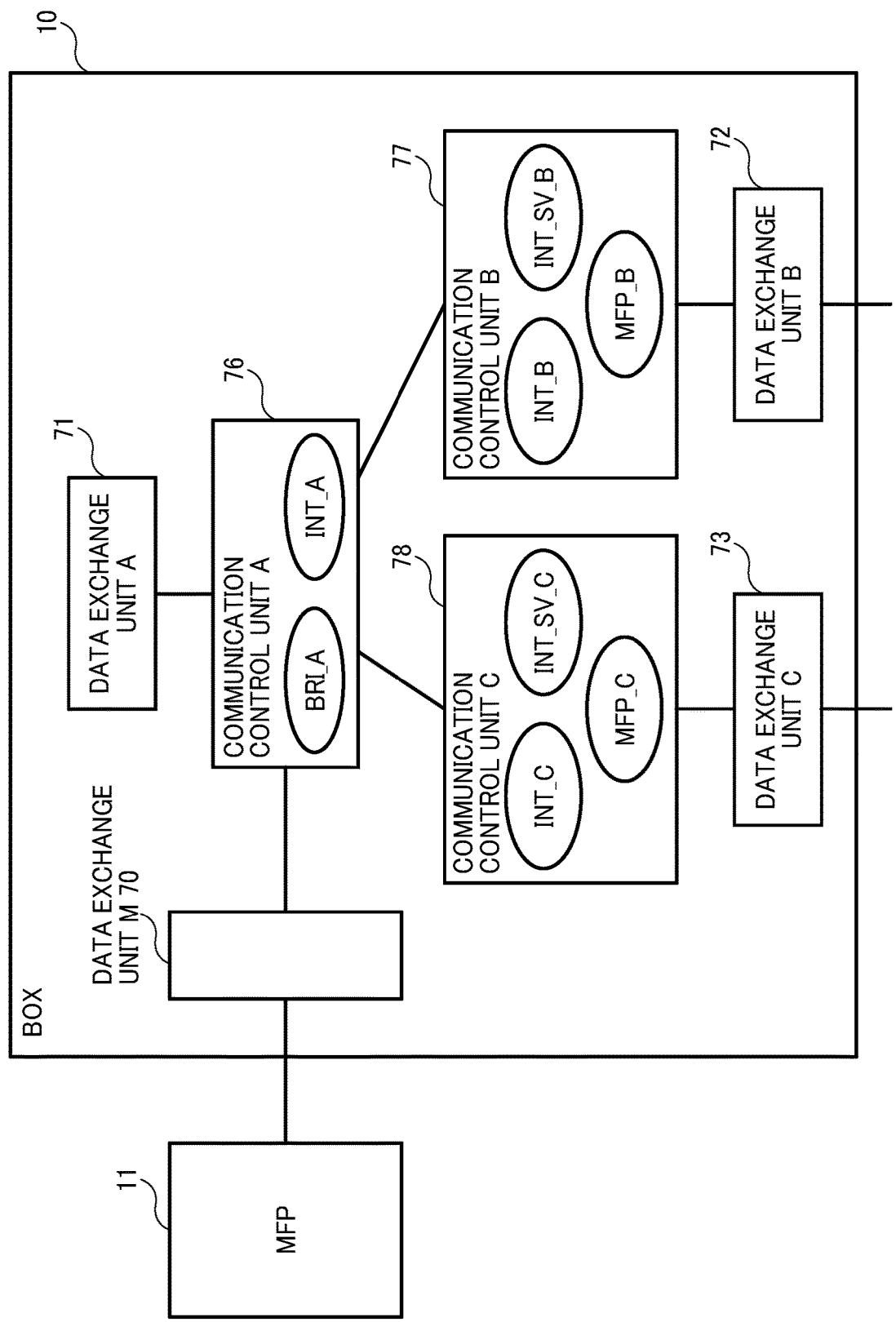
FIG. 13 is a diagram illustrating an example of an IP address of the communication control apparatus.
Figure 14:
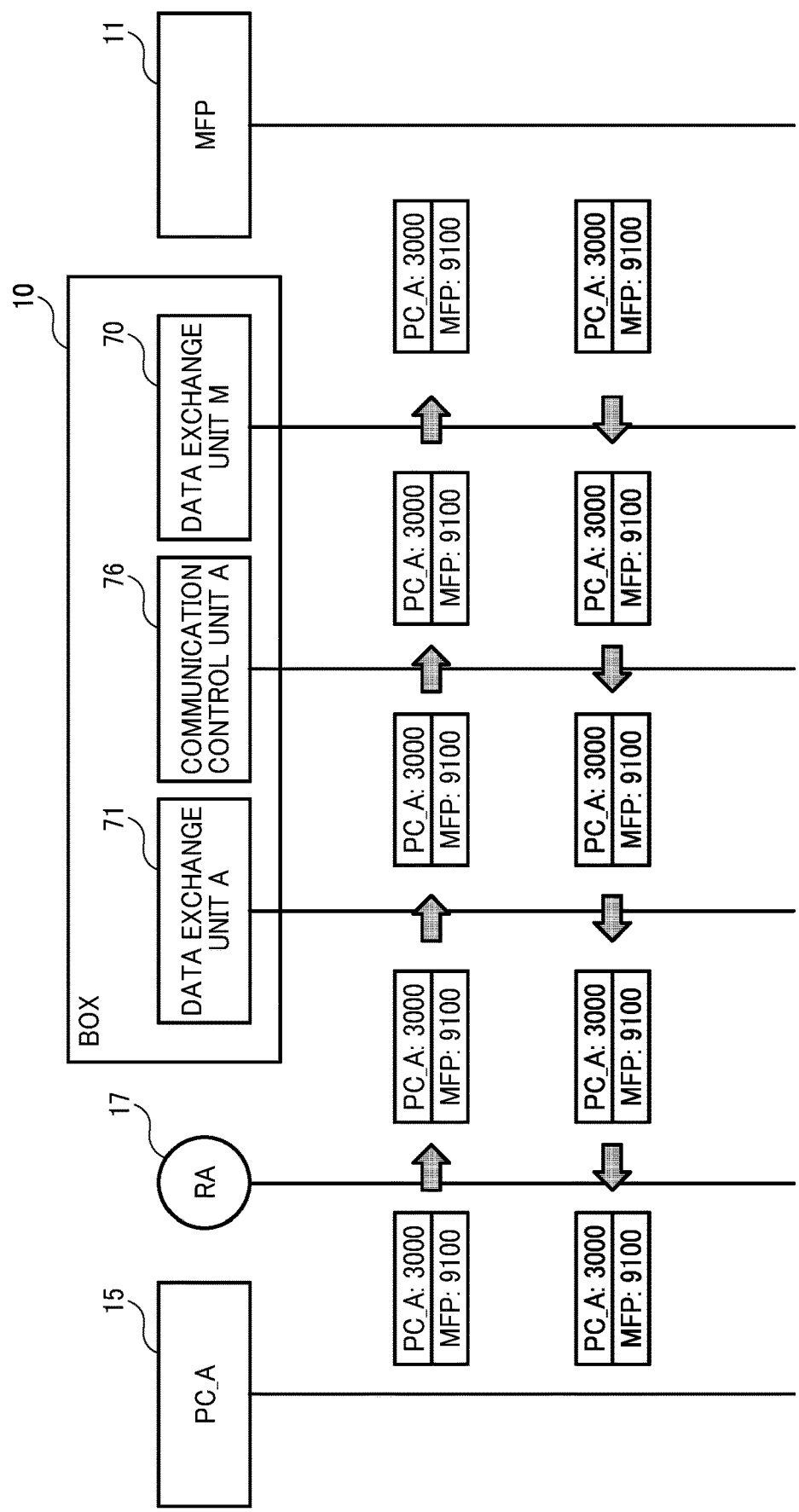
FIG. 14 is a diagram illustrating a first example of packet flow during printing from a PC to a multifunction peripheral (MFP)
Figure 15:
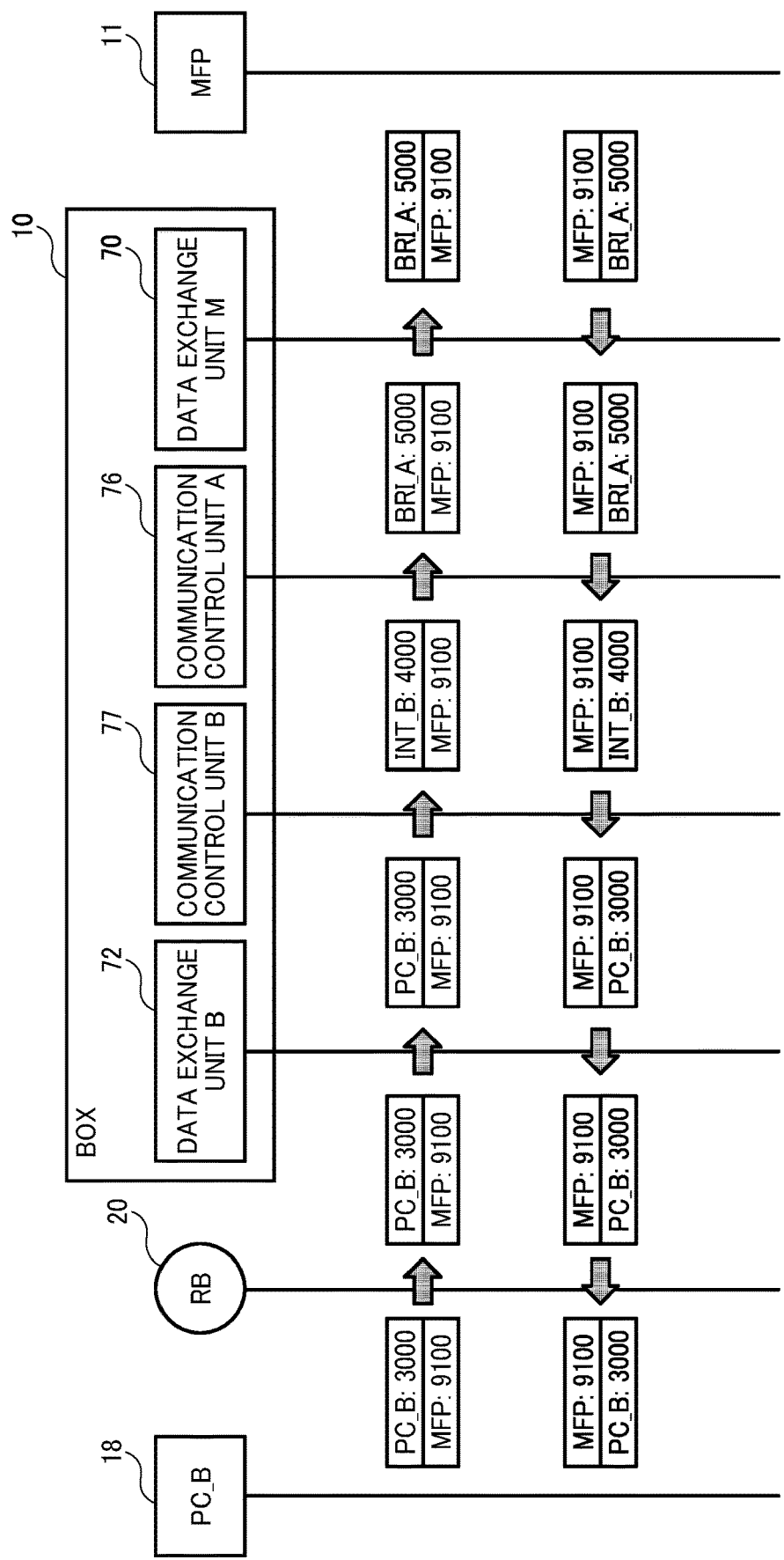
FIG. 15 is a diagram illustrating a second example of packet flow during printing from the PC to the MFP.

With reference to FIGS. 13 to 15, a flow of packets during printing from the PCs 15 and 18 on the networks 12 and 13 using the communication control units 76 and 77 to the MFP 11 is described. Since the flow of packets during printing from the PC 21 on the network 14 to the MFP 11 is the same as the flow of packets during printing from the PC 18 on the network 13 to the MFP 11, the description thereof is omitted here. Further, since the flow of packets from the MFP 11 to the devices on the networks 12 to 14 is only the reverse flow of the flow of packets described here, the description thereof is omitted.

The communication control unit 76 has an IP address (BRI_A) that is a source of packets sent from the data exchange units 72 and 73, that is, packets coming from devices on the networks 13 and 14 to the MFP 11. BRI_A is the IP address of the network 12 assigned to the box 10 by the DHCP server 16 when the IP address is set to be automatically acquired from the DHCP server 16. Further, the communication control unit 76 has an IP address (INT_A) used only inside the box 10 as a source of the packet for sending the packet coming from the MFP 11 to the data exchange units 72 and 73. INT_A is an IP address that is not used in the network.

The communication control unit 77 has an IP address (INT_B) that is used only inside the box 10 as a transmission source of the packet for sending the packet coming from the data exchange unit 72 to the communication control unit 76. INT_B is the IP address that is not used in the network just like INT_A. The communication control unit 77 has an IP address (INT_SV_B) used only inside the box 10 for transmitting a packet coming from the communication control unit 76 to a device (SV_B) on the network 13. Further, the communication control unit 77 has an IP address (MFP_B) for accessing the MFP 11 from the device on the network 13. MFP_B is the IP address of the network 13 assigned to the box 10 by the DHCP server 19 when the IP address is set to be automatically acquired from the DHCP server 19.

The communication control unit 78 has an IP address (INT_C) that is used only inside the box 10 as a transmission source of the packet for sending the packet coming from the data exchange unit 73 to the communication control unit 76. INT_C is an IP address that is not used in the network just like INT_A and INT_B. The communication control unit 78 has an IP address (INT_SV_B) used only inside the box 10 for transmitting a packet coming from the communication control unit 76 to the device (SV_B) on the network 14. Further, the communication control unit 78 has an IP address (MFP_C) for accessing the MFP 11 from the device on the network 14. Each IP address is set manually except for the IP address that are set to be automatically assigned by DHCP.

In this example, the destination device for transmitting a packet from the MFP 11 to the networks 13 and 14 is a server (SV_B, SV_C), but the present disclosure is not limited to this.

The IP address is associated with a port and the packet is sent to the port associated with the IP address. With reference to FIGS. 14 and 15, a flow of packets using the port is described.

FIG. 14 is a diagram illustrating the flow of packets at the time of printing from the PC 15 to the MFP 11. The PC 15 is the device on the network 12, and the box 10 bridges and transfers the packet.

The PC 15 transmits the packet using the IP address of the MFP 11. At this time, the packet is transmitted with the destination as the port (9100) of the MFP 11 and the source as the port (3000) of the PC 15. In bridge forwarding, port translation is not performed, so the port does not change when passing through the router 17 and box 10.

When the printing is completed, the MFP 11 returns a response by a packet, indicating that the printing is completed. Similarly, the port of the response packet does not change when passing through the box 10 and the router 17.

FIG. 15 is a diagram illustrating the flow of packets at the time of printing from the PC 18 to the MFP 11. The PC 18 is the device on the network 13, and the box 10 performs NAPT and transmits the packet to the MFP 11.

The PC 18 transmits the packet using the IP address of the MFP 11. The packet is transmitted with the destination as the port (9100) of the MFP 11 and the source as the port (3000) of the PC 18. The packet is sent to the box 10 through the router 20. The communication control unit 77 converts the source port (3000) into the port (4000) corresponding to INT_B and transmits the packet to the communication control unit 76. At this stage, the port of the source of the packet is 4000. The communication control unit 76 converts the source port (4000) to the port (5000) corresponding to BRI_A and transmits the packet to the MFP 11. The port of the source of packet to be sent to the MFP 11 is 5000.

When the printing is completed, the MFP 11 returns a packet of a response indicating that the printing is completed to the PC 18. The packet is transmitted with the destination as the port (5000) and the source as the port (9100). In the box 10, the reverse conversion of the packet transmitted from the PC 18 to the MFP 11 is performed. Specifically, in the communication control unit 76, the transmission destination port is converted from 5000 to 4000, and in the communication control unit 77, the transmission destination port is converted from 4000 to 3000. Then, the packet is transmitted to the PC 18 through the router 20 with the destination as the port (3000).

As described above, according to the present disclosure, it is possible to acquire the address information assigned to the device and the identification information of the device without changing the mechanism of the DHCP server. The address information has a time limit set by DHCP and changes due to reassignment, but by periodically executing the process of acquiring the address information and the identification information, the address information and the identification information is updated even when reassigned due to the time limit. Further, by performing the process of acquiring the address information and the identification information at the time of link down or link up of ETHERNET (registered trademark), the address information and the identification information is updated even when reassigned by restarting the MFP 11.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A communication control apparatus comprising:
  circuitry configured to:
  store in one or more memories, identification information for identifying a registered device;
  send a packet to a network to search for a device connected to the network;
  acquire address information assigned to the device connected to the network and identification information of the device connected to the network from the device that responded to the packet; and
  control communication of the registered device using connection information that associates the identification information stored in the one or more memories with the address information of the device having the acquired identification information that matches the identification information stored in the one or more memories.

2. The communication control apparatus of claim 1, wherein
  the circuitry is further configured to:
  request the address information of the device that responded to the packet based on information included in a response to the packet; and
  acquire the identification information of the device that responded to the packet by performing address resolution based on the acquired address information.

3. The communication control apparatus of claim 1, wherein
  the circuitry sends the packet to search for the device connected to the network at a regular time interval.

4. The communication control apparatus of claim 1, wherein
  the circuitry sends the packet to search for the device connected to the network after a connection with the registered device is disconnected and reconnected.

5. The communication control apparatus of claim 1, further comprising:
  a first communication interface configured to communicate with the registered device; and
  one or more second communication interfaces each configured to communicate with one of one or more networks; and
  in response to the first communication interface receiving first information including connection information of a transmission source that matches the connection information stored in the one or more memories, the circuitry is configured to transfer the first information from the first communication interface to one of the one or more second communication interfaces.

6. The communication control apparatus of claim 5, wherein
  in response to one of the one or more second communication interfaces receiving second information including connection information of a transmission source that does not match the connection information stored in the one or more memories, the circuitry is further configured to transfer the second information from the one of the one or more second communication interfaces to the first communication interface.

7. The communication control apparatus of claim 1, wherein
the circuitry is further configured to:
store the connection information in the one or more memories; and
in response to an expiration of a time limit provided to address information assigned to the registered device, delete the connection information stored in the one or more memories.

8. The communication control apparatus of claim 1, wherein
the circuitry is further configured to:
store the connection information in the one or more memories; and
in response to a disconnection of a connection with the registered device, delete the connection information stored in the one or more memories.

9. A communication system comprising:
the communication control apparatus of claim 1; and
a device configured to be controlled by the communication control apparatus.

10. A communication control method comprising:
storing identification information for identifying a registered device;
sending a packet to a network to search for a device connected to the network;
acquiring address information assigned to the device connected to the network and identification information of the device connected to the network from the device that responded to the packet; and
controlling the communication of the registered device using connection information that associates the identification information stored in one or more memories with the address information of the device having the acquired identification information that matches the identification information stored in the one or more memories.

11. A non-transitory recording medium storing a plurality of instructions which, when executed by one or more processors, causes the processors to perform a communication control method comprising:
storing identification information for identifying a registered device;
sending a packet to a network to search for a device connected to the network;
acquiring address information assigned to the device connected to the network and identification information of the device connected to the network from the device that responded to the packet; and
controlling the communication of the registered device using connection information that associates the identification information stored in one or more memories with the address information of the device having the acquired identification information that matches the identification information stored in the one or more memories.

\* \* \* \* \*